United States Patent [19]
Valentine et al.

[11] Patent Number: 4,793,016
[45] Date of Patent: Dec. 27, 1988

[54] CONDUIT CLEANING APPARATUS

[76] Inventors: David E. Valentine, 2320 Valley High Dr., Independence, Kans. 67301; Michael J. Orgeron, 2261 Killington Dr., Harvey, La. 70058

[21] Appl. No.: 925,053

[22] Filed: Oct. 30, 1986

Related U.S. Application Data

[63] Continuation-in-part of Ser. No. 839,261, Mar. 13, 1986, abandoned.

[51] Int. Cl.⁴ .............................................. B08B 9/04
[52] U.S. Cl. ................................. 15/104.062; 137/268
[58] Field of Search ............... 15/104.06 A, 104.06 B, 15/3.5, 3.51; 137/268; 134/8

[56] References Cited

U.S. PATENT DOCUMENTS

| | | | |
|---|---|---|---|
| 2,915,422 | 12/1959 | Stone | 15/104.06 A |
| 3,000,028 | 9/1961 | Buie et al. | 15/104.06 A |
| 3,063,080 | 11/1962 | Bergman et al. | 15/104.06 A |
| 3,682,186 | 8/1972 | Howe | 15/104.06 A X |
| 3,779,270 | 12/1973 | Davis | 15/104.06 A X |
| 4,199,834 | 4/1980 | Muchow et al. | 15/104.06 A |
| 4,401,133 | 8/1983 | Lankston | 15/104.06 A X |

Primary Examiner—Edward L. Roberts
Attorney, Agent, or Firm—Cushman, Darby & Cushman

[57] ABSTRACT

Apparatus for cleaning the interior of a pipe while the pipe is carrying a fluid under pressure includes a ball launcher which is operable to remove a ball from a magazine and locate the ball in the flow path of the conduit to be cleaned without blockage for locking of the ball launching device; a ball receiver is located at a distance from the launcher to positively stop and remove both the debris removed from the conduit by the cleaning ball and to remove the ball from the flow line automatically and dispose it in a storage container for subsequent retrieval.

19 Claims, 3 Drawing Sheets

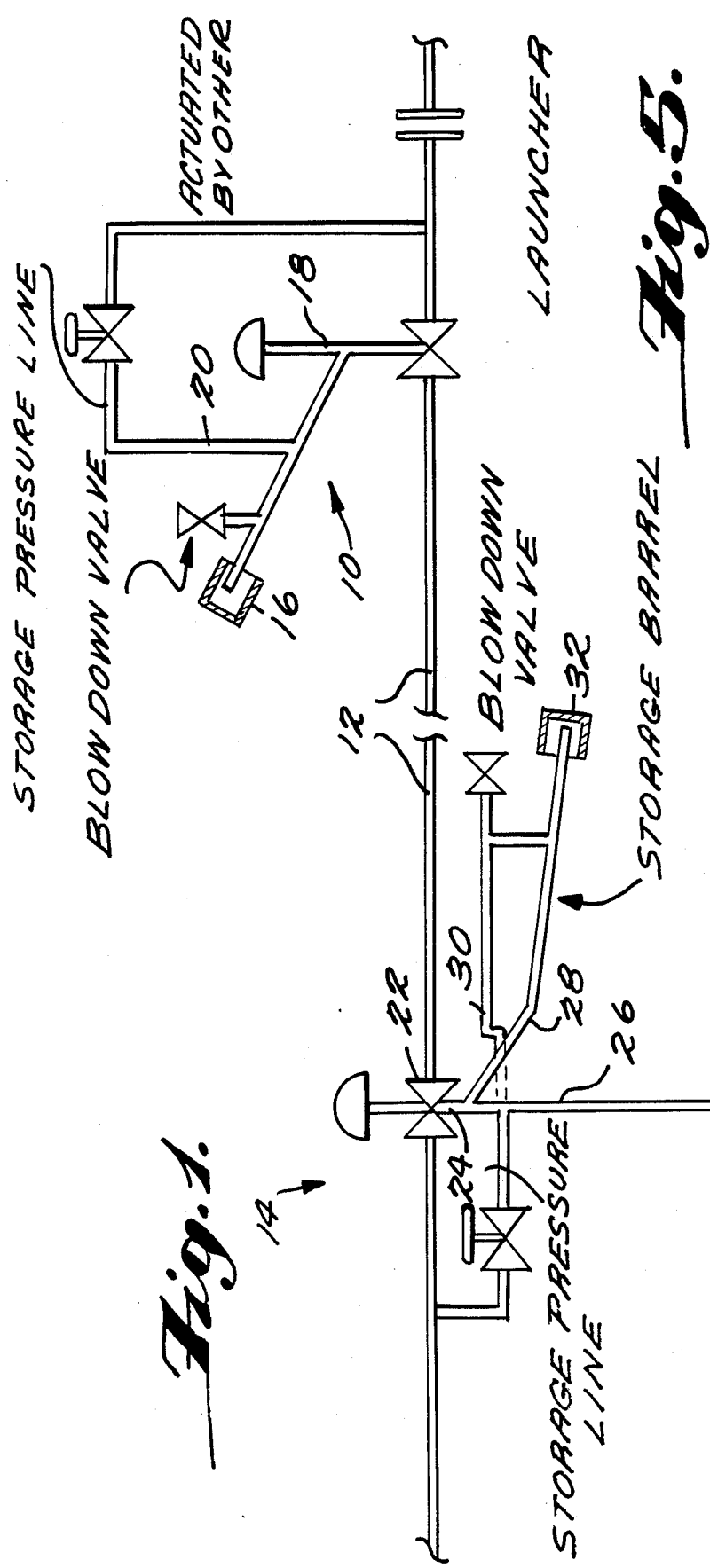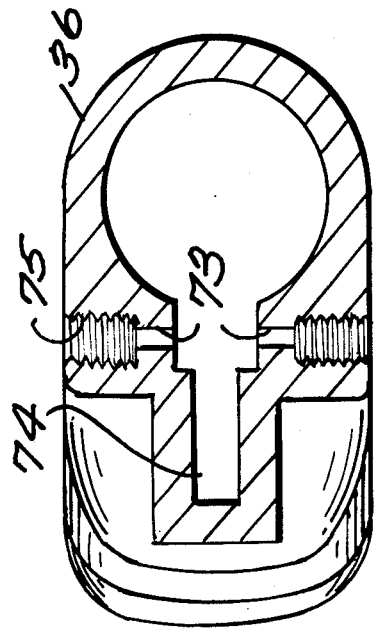

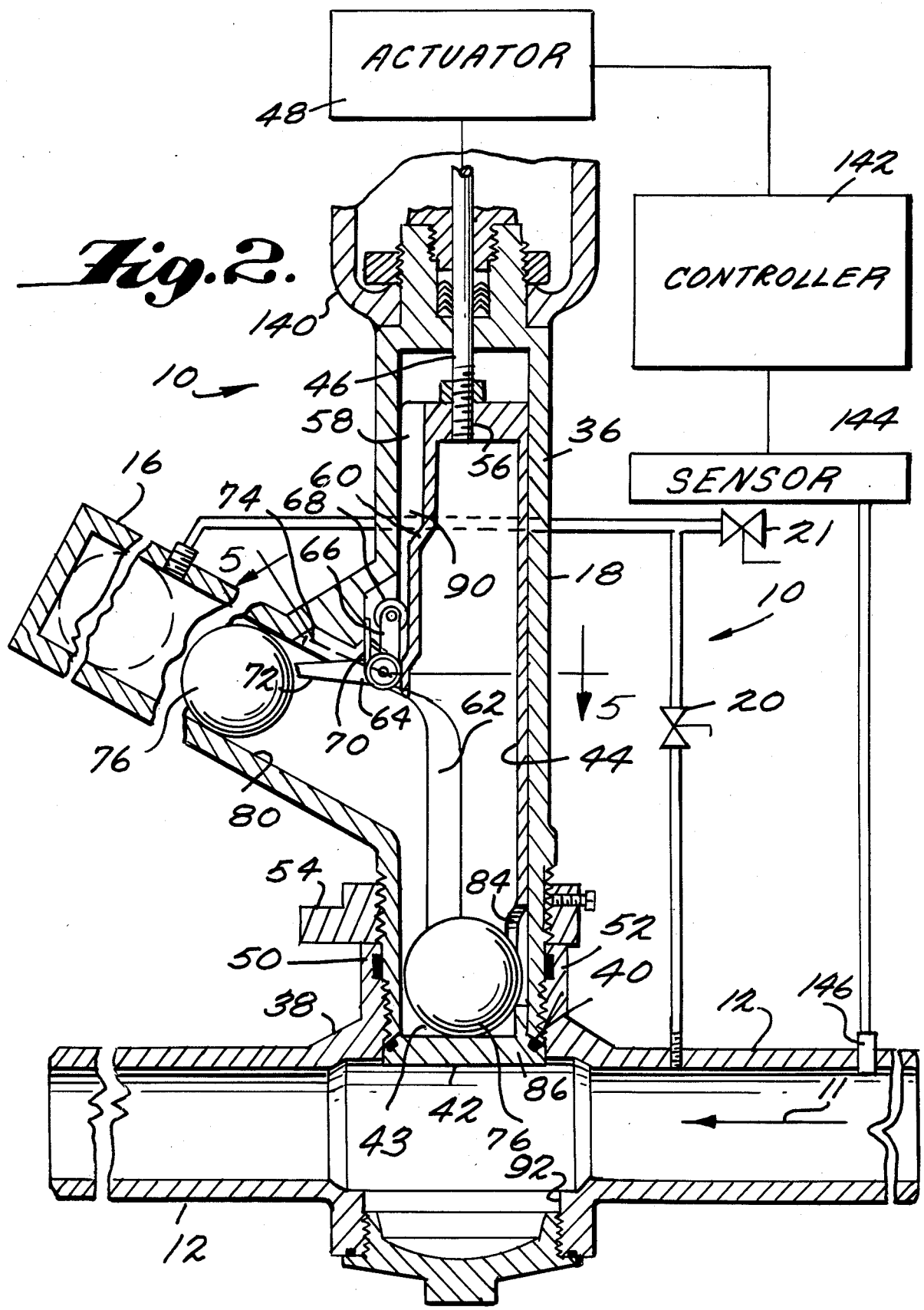

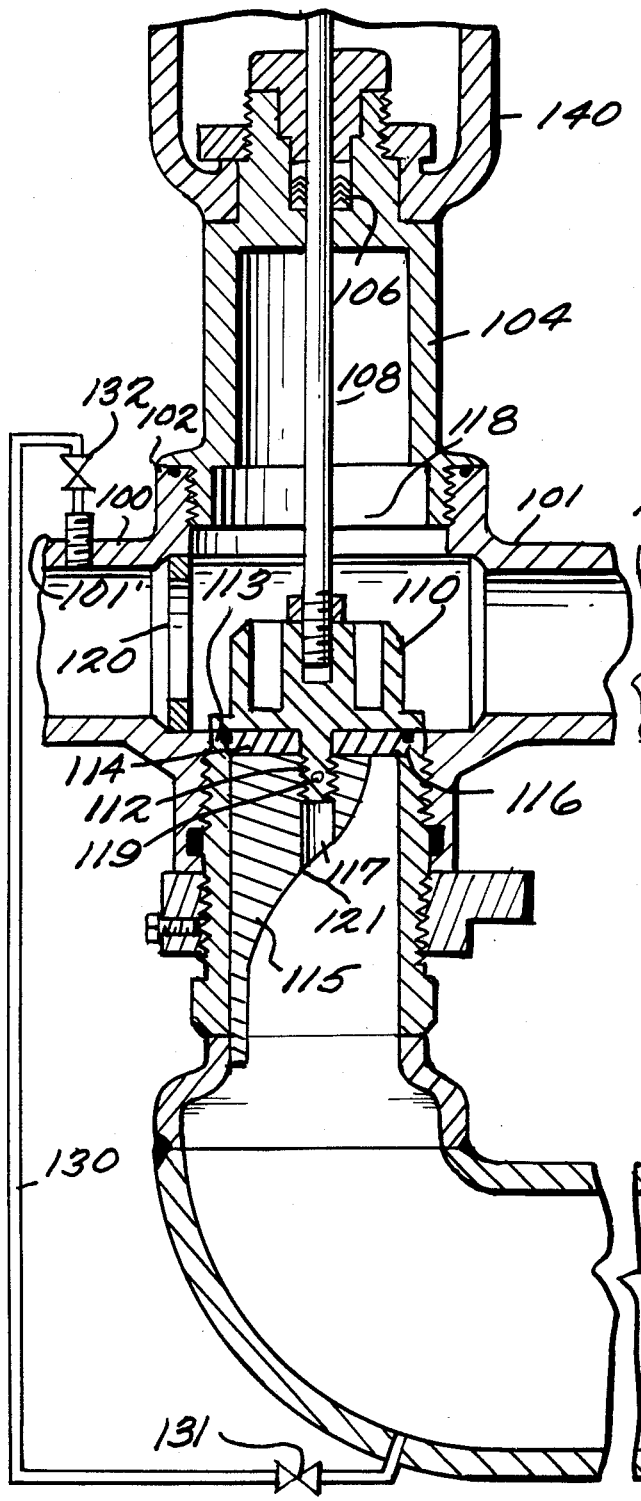
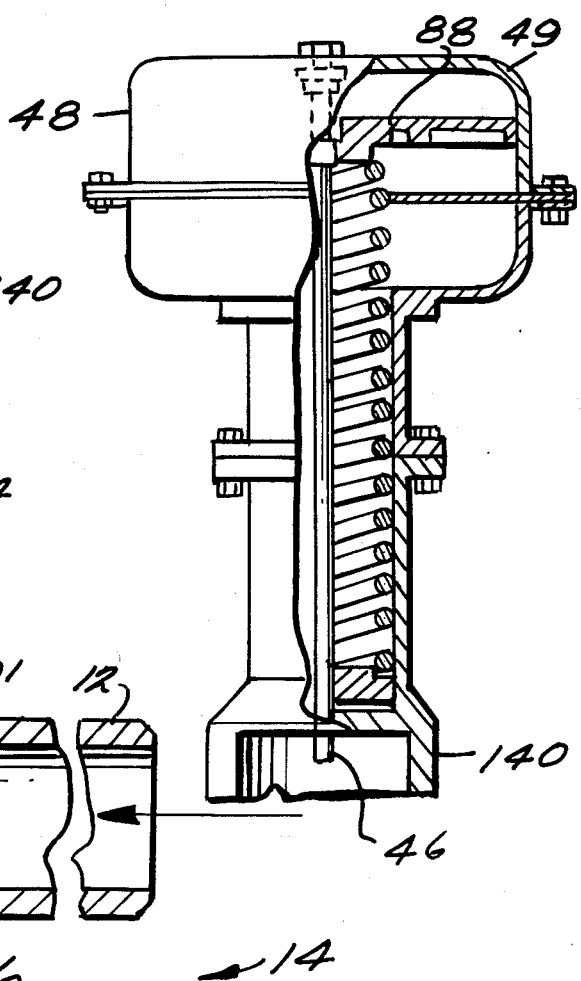

CONDUIT CLEANING APPARATUS

This is a continuation-in-part application of Ser. No. 839,261, filed Mar. 13, 1986, now abandoned, and assigned to the same Assignee as the present application.

BACKGROUND AND SUMMARY OF THE INVENTION

The present invention relates to an apparatus for cleaning the interior of a conduit line while the conduit is carrying a fluid under pressure. More specifically, the present invention is directed to apparatus for injecting into the sealed conduit line a cleaning element termed a "pig" or other similar cleaning element which is carried along the conduit by the fluid flowing therethrough and during its travel cleans the walls of the conduit of materials that accumulate over time.

In the past, the pipeline industry has employed a number of devices to clean out the interior of lines that carry natural gas, oil and chemicals from one point to another. A number of these devices have required close monitoring and several workers to assure proper operation of the cleaning device. For relatively large diameter pipelines, such as, for example, those on the order of one foot or more in diameter, it has been necessary to close down the pipe and drain it of its contents before a mechanical scraping device could be passed along the conduit to carry out the cleaning operation. In view of the relatively large cross-sectional area of such conduits, the cleaning operations could be carried out at intervals that were sufficiently spaced apart so that the economic consequences of a complete shutdown of the pipeline could be tolerated. However, with smaller diameter pipelines, and particularly those operating with certain types of products such as those carrying oil having a relatively high paraffin content, water condensate or other types of materials that would tend to participate out of the flow, substantially more frequent cleaning of the pipeline would be required. This is particularly true in northerly climates where exposed sections of the pipeline were subjected to freezing temperatures. In such environments, frequent and regular periodic traversal of the pipeline by a cleaning element such as a pig is required to maintain safe and economical operation of a pipeline. However, where the pipeline extends through remote or inaccessible areas, there is presently no satisfactory apparatus available that can be both reliably operated by a timing mechanism and still be operated by remote control to dispense and retrieve a cleaning element along a selected length of a pipeline. In a number of the manually operable cleaning systems, a worker must be present at the pig launch site to make sure that the pig is properly loaded and actually launched. Where the pipeline runs through remote areas, the cost of having one or more workers travel to the launch site can render the use of such cleaning devices prohibitive.

The present invention overcomes the foregoing difficulties and provides a very effective cleaning element launching and recovery or retrieving stations which can be operated very efficiently by remote control or by a timing device to periodically dispense and retrieve a cleaning element and one which does not require the presence of an operator for initiation or termination of a cleaning cycle.

In a preferred embodiment, the present invention provides a casing that is connected to the flow path of a conduit. The casing houses an injector member which has a carrier portion for receiving and holding a cleaning element which is preferably a spherical member of a diameter such as to closely interfit with the interior of the pipe to be cleaned. An actuating device which may be remotely controlled moves the injector member from a retracted position where the casing is sealed off from direct contact with the flow to an injected position where the carrier portion moves across the flow path to expose the cleaning element to the fluid flowing through the conduit whereby the cleaning element is carried off the carrier portion of the injector member and passed along the conduit to effect cleaning of the wall of the conduit. Downstream at a selected position, a retrieving apparatus is provided which includes a connection member which houses a valve which is operable to open and close a discharge opening immediately upstream of an obstacle which prevents a cleaning element from passing further down the conduit. The cross-sectional area of the discharge opening and the conduit connected thereto is larger than the cross-sectional area of the conduit so that the predominant flow when the valve is open is into the discharge opening. Downstream of the conduit connected to the discharge opening, a branch is provided. Vertically below the discharge opening and below the branch a storage tank is connected for collecting the fluid passing through the discharge opening when the valve is open. A barrier member such as a screen is permanently positioned across the conduit leading to the storage tank. At the branch, a second conduit leads to a storage barrel for collecting the cleaning elements passed through the discharge opening.

The arrangement of the present invention will permit rapid installation of the launching and retrieving assemblies at desired locations along the length of pipeline and an apparatus where both the launching of the cleaning elements as well as their retrieval can be accomplished by remote control, by a timing mechanism or by a mechanism that is sensitive to a condition of the pipeline such as fluid velocity or fluid pressure.

The foregoing and other advantages will become apparent as consideration is given to the following detailed description taken in conjunction with the accompanying drawings in which:

BRIEF DESCRIPTION OF THE DRAWINGS

FIG. 1 is a schematic illustration of the apparatus of the present invention;

FIG. 2 is a sectional view in elevation of the launching apparatus of the present invention;

FIG. 3 is a sectional elevational view of the retrieval apparatus of the present invention;

FIG. 4 is an illustration partly in section of an actuating device that can be used with the launching and retrieving apparatus of the present invention; and FIG. 5 is a view along lines 5—5 of FIG. 2.

DETAILED DESCRIPTION OF THE INVENTION

Referring now to the drawings wherein like numerals designate corresponding parts throughout the various views, there is shown in FIG. 1 a schematic illustration of the apparatus of the present invention. The invention includes, in general, a launching device 10 which serves to inject a cleaning element such as a spherical member into the fluid flow in a conduit 12. The launcher 10 includes a storage container or barrel 16 which is connected to discharge one at a time, as explained below, a cleaning element into an injector member 18. A bleed line 20 is provided to provide fluid flow to the rear of the storage container 16 when the injector member 18 is open to fluid flow in the conduit 12. The bleed line 20 is provided with a blow down valve 21, which will function to relieve pressure in the storage container 16 when the storage container 16 is cut off from the flow in the conduit 12. After injection, the cleaning element is carried along the interior of the conduit 12 until it reaches a receiving station 14 which comprises a valve 22 which opens a discharge opening leading to a common conduit 24 having a predetermined cross-sectional area larger than that of the conduit 12. With a blocking device located downstream of the discharge opening, as explained below, fluid flow when the valve 22 is open will be predominantly into the common conduit 24 where a Y branch is provided to a discharge conduit 26 and a storage container 28. Again, a bleed line 30 is provided to facilitate fluid flow into the common conduit 24 and into the cleaning element storage member 32.

Waste material and excess fluid will be discharged through the conduit 26 to a liquid storage tank 34.

With reference now to FIG. 2, there is shown in detail, the injector means 10 of the present invention. The injector means 10 includes a casing 36 for the injector means 18. The lower end of the casing 36 is secured to a coupling housing 38 in this embodiment which, in turn, is connected in a well known manner to the conduit 12. The lower end of the casing 36 is provided with an opening 40 which is sealingly closed by a carrier portion 42 of the injector member 44. The injector member 44 is a hollow member which is movably mounted on the interior of the casing 36 and is operated by a shaft 46 which passes upwardly through packing material and is connected to an actuating means 48, described hereinafter. To facilitate servicing of the apparatus, it is useful to have the casing 36 removably mounted in the coupling housing 38. In this regard, the lower outer end of the casing 36 may be threadedly interconnected as at 50 with a cylindrical opening 52 in the housing 38 with a retaining collar 54 being provided to securely lock the casing 36 in place.

The upper end of the injector member 44 may be threadedly attached as at 56 to the shaft 46 with a lock nut, or other suitable securing means as are well known in this art. Along one side of the exterior of the injector member 44, a stepped key race 58 is provided with the step 60 being provided at approximately the mid point of the length of the key race 58. Below the key race, an extended slot 62 is provided which extends from approximatley the mid point of the injector member 44 to the carrier portion 42 of the injection member 44.

The casing 36 is provided with a cleaning element releasing member 64 which is in the form of a pivoting lever having a first arm 66 which terminates in a roller 68 which rides in the key race 58. A spring 70 is provided to continually urge the arm 66 into engagement with the key race 58. Rigidly connected with the arm 66 is the second arm 72 of the releasing element which is pivotable in the directions of the arrows between a releasing position and a projecting position. In the releasing position, the arm 72 is located in a recess 74 formed in the adjacent wall of the casing 36 corresponding to when the injector member 44 is in an injected position where the deeper portion of the key race 58 is contacted by the roller 68. Upon movement of the injector member 44 to a retracted position as illustrated in FIG. 2 the roller 68 will be moved to its counter-clockwise illustrated position corresponding to movement of the arm 72 to its projecting position where it obstructs passage of cleaning elements 76 down the channel 80 of magazine 16. It will be understood that the magazine 16 can be of any selected length and thus contain any number of cleaning element balls or spheres 76 as desired.

The cleaning elements 76 are selected to have a diameter just slightly less than the internal diameter of the conduit 12. Conventionally, these cleaning elements are made of hard rubber or neoprene but for certain uses they can be compressible as is well understood in this art.

With reference to FIG. 5, there is shown a view of the casing 36 with the injector 44 and the releasing member 64 removed for clarity. In releasing member 64 will be formed with two pivot axles which are inserted into bores 73. Outwardly of the inner end of the bore 73, threaded counterbores 75 are provided on each side of the casing 36 and these are closed with plugs not shown which will include zerk fittings to continually provide lubrication to the axles of the member 64.

When the injector member 44 is moved to its injected position, the carrier portion 42 moves substantially entirely across the flow path defined by the conduit 12 and the Corresponding element or housing 38 whereupon the cleaning element 76 will be exposed to the flow of fluid from the conduit 12 flowing in the direction of arrow 11. To prevent premature displacement of the cleaning element 76 from the carrier portion 42, the fluid flow port 84 is spaced by a wall 86 from the interior floor 43 of the carrier portion 42. Thus, the provision of the wall 86 will prevent immediate discharge of the cleaning element 76 from the floor portion 73 and thus will minimize the possibility of the fluid flow from moving the cleaning element back up the injector member 44. Another means are also provided to ensure discharge of the cleaning element 76 down the conduit 12. When the carrier portion 42 is moved off of its seat 40 flow of fluid in the magazine opening will commence due to the provision of a bleed line 20 so that the predominant flow will be downwardly in the lower portion of the casing and injector member.

In establishing the connection of the housing 38 and the casing 36, the location of the magazine 16 can be used as an indicator for orienting the device. Specifically, the casing 36 and the magazine 16 should be located vertically above the conduit 12 and on the downstream side of the housing 38. With this arrangement, the cleaning element releasing arms 64 due to engagement of the roller 68 in the key race 58 will keep the injector member 44 properly aligned so that the port 84 will always be pointed substantially in an upstream direction. In operation, an actuating device 48 such as that illustrated in FIG. 4, may be employed which is commercially available from Fisher Controls of Marshalltown, Iowa. A preferred type of actuator of Fisher Controls is that represented in FIG. 4 which is one that is gas actuated where the shaft 46 is connected to a diaphragm 88. Upon receipt of an appropriate signal or by suitable manual operation, the area in the container 49 above the diaphragm 88 is filled with a gas to force the diaphragm 88 downwardly against the spring resulting in movement of the injector member 44 downwardly from its retracted position to an injected position resulting in discharge of the cleaning elements 76 from the floor 43 of the carrier portion 42 of the injector member 44. Correspondingly, as the stepped portion 60 passes the roller 68, the arm 72 will be pivoted upwardly to permit the next cleaning element 76 to move down under the influence of gravity in the magazine 16 until it abuts against the then blocking wall 90 located on the exterior surface of the injector 44. After a brief interval, the actuating mechanism 48 will be reactivated to move the injector member 44 from its injected position where the carrier portion 42 is immediately adjacent the seat 92 to its retracted position as illustrated in FIG. 2. As the slot 62 moves upwardly, it will present an increasingly larger opening for the spherical cleaning element 76 so that the spherical cleaning element 76 will immediately enter the slot 62 as soon as a sufficient opening space is made available to it. Thereupon, under the influence of gravity as well as fluid flow resulting from fluid originating from the bleed line 20, the released cleaning element resting against the surface 90 will pass through the slot 62 and down to the surface 43 of carrier portion 42 to be available for the next injection.

The cleaning element, as is conventional, will then travel down the length of conduit pushing before it any accumulated waste material such as paraffin accumulations and, in low lying portions of the conduit 12, ice build-up that may have collected since the last cleaning cycle. The cleaning element is then retrieved at a retrieving station 14 described below.

The retrieving apparatus 14 of the present application is illustrated in FIG. 3 and includes a coupling housing 100 which is placed in line with the conduit 12 in the same manner as the housing 38 of the launcher injection apparatus 10. Also as with the housing 38, the housing 100 has an upwardly opening threaded portion 102 into which is threaded a fitting 104 having a packing member 106 through which a valve carrying shaft 108 is slidably mounted just as the shaft 46. The lower end of the shaft 108 is connected to a skirt 110 which is provided on its lower face with a connection lug 112 on which is mounted a valve plate 114 which may be surrounded by resilient sealing material 113. Threaded onto the leg 112 is a diverter member 115 which has a bore 117 which is threaded at least at its upper end for mounting on the lug 112. The upper portion of the diverter 115 is provided with a pin bore which is alignable with a bore in the lug 112 whereby a pin 119 is insertable through the bore in the diverter 116 and through the pin bore in the lug 112 to orient the diverter 115 relative to the direction of flow in the conduit 12. With this arrangement, when the valve plate 114 is raised by movement of the shaft 108, the diverter 115 will be placed across a portion of the diameter of the flow path through the valve chamber 118 so that a cleaning element 76 will impact on the sloping portion 121 of the diverter 115 and be directed downwardly into the common conduit 122. The width of the diverter 115 is such that it extends only partially across the diameter of the valve chamber corresponding to the flow-path of conduit 12 so that flow around the diverter will be permitted while passage of a cleaning element will be prevented. The size of the skirt 110 should be such that a cleaning element cannot enter the space above the skirt when the valve 114 is closed. On the opposite side of the housing 100 to the portion 102 a valve seat 116 is provided to mate with the bevelled face of the valve plate 114. The upstream and downstream connecting portions 101 and 101' are of the same internal diameter as the conduit 12 whereas the opening 116 is of a larger diameter. The downstream connection portion 101' opens on the valve chamber 118 and is provided with a blocking screen 120 which will prevent a cleaning element 76 from passing into the portion 101'. A lower portion of the housing 100 is threaded to receive a common conduit 122 having the same internal diameter as the opening 116 and is branched to provide a flow path 124 located vertically below the opening 116 which leads to the liquid storage tank 34 and at 126 which leads to the cleaning element storage container 32, which may be of the same dimensions as the magazine 16. A suitable blocking member 128 extends at an angle across the branch between branches 124 and 126 to permit fluid flow of liquid and refuse downwardly to the storage tank 34 while serving to deflect cleaning elements to the cleaning element storage container 32. The shaft 108 may be operated by a device 48 similar to that used for the shaft 46 in FIG. 2. Thus, when the device 48 is actuated, such as by a remote control device, the shaft 108 will be lifted to move the valve plate 114 upwardly a sufficient distance to permit a cleaning element 76 to enter the chamber 118. Due to the difference in the cross-sectional areas between the conduit 12 and connecting portions 101 and 101' and the passage of the common conduit 122, fluid flow will be generally vertically downwardly into the conduit 122 which will be effective to carry waste material preceding a cleaning element and, with the assistance of the diverter 115, a cleaning element itself downwardly into the conduit 122 whereupon effective separation of the cleaning element 76 and the waste material and excess fluid will be accomplished at the blocking bars 128. A bleed line 130 is normally open to assist in the fluid flow downwardly into conduit 122 when the valve 114 is open. A blow down valve 131 is provided on the line 130 so that when the valve 114 is closed, any fluid pressure buildup in the magazine and storage tank 34 may be relieved manually or automatically by operation of the valve 131.

When the cleaning element storage container 32 is full to capacity after a number of cleaning cycles, valve 132 will be closed and, with valve 114 closed the storage container 32 will be blown down and then opened and the retrieved cleaning elements will be removed for later reuse by being returned to the magazine 16 in the injector apparatus 10. The same procedure may be used to load the magazine 16 with elements 76.

While the actuator 48 may be of any suitable type, the gas operated Fisher Control illustrated in FIG. 4 is preferred due to its high reliability. These devices are commonly provided with a yoke 140 which are easily securable as illustrated in FIGS. 2 and 3 to the uppermost portion of the respective casing 36 and fitting 104.

Turning now to FIG. 2 again, the actuator 48 may be connected to a controller 142 which may be a commercially available solenoid actuated gas delivery tank where the solenoid valve may be operated by remote control such as over telephone lines from a remote site where the pipeline operation would normally be monitored. The controller could be operated in response to a sensing device 144 which may be a conventional pressure sensor having a pressure detector 146 inserted into the conduit 12 at an appropriate location. The foregoing control devices would be provided in addition to a manual control which may also be made available at each injector location and retrieving station. The retrieving station would have a corresponding control apparatus 142 which could be linked electronically with both controlled by a computer program so that the valve 114 would be opened after a predetermined time dependent on the velocity of fluid flow through the conduit 12 after injection of a cleaning element 76 upstream of the retrieving station at 14. The program could well be set to activate a cleaning cycle upon detection of a condition in the pipeline.

Having described the invention, it will be apparent to those skilled in this art that various modifications may be made therein without departing from the spirit and scope of this invention as defined in the appended claims.

What is claimed is:

1. Apparatus for cleaning a length of a conduit while the conduit carries fluid under pressure along the flow path defined by the length of the conduit, the apparatus comprising injector means mountable at a selected location along the length of the conduit, said injector means including a casing and an injector member in said casing and having a carrier portion for carrying a cleaning element, said carrier portion including a floor on which the cleaning element will rest, said injector means having a side which will be exposed to the flow of fluid in the conduit, said floor having wall means extending a selected distance from said floor of said carrier portion to prevent premature discharge of a cleaning element therefrom when said side of said injector means is exposed to fluid flow in the conduit, said injector member being movable relative to said casing between a retracted position where said carrier portion is out of the flow path of the conduit and an injected position where said carrier portion including said wall means is moved through the flow path of the conduit so that said cleaning element will be exposed to the fluid flowing through the conduit after said wall means enters said flow path so as to be movable off said carrier portion and into said conduit.

2. The apparatus as claimed in claim 1 wherein said injector means includes magazine means for containing a plurality of said cleaning elements and dispensing means for supplying one said cleaning element to said carrier portion in response to a movement of said injector member from said injected position to said retracted position.

3. The apparatus as claimed in claim 2 wherein said casing includes cleaning element releasing means operable in response to movement of said injector member between said retracted and injected positions to release one of said cleaning elements from said magazine means for supplying said one cleaning element to said carrier portion as said injector member is moved to said retracted position.

4. The apparatus as claimed in claim 3 wherein said releasing means and said casing include cooperating means for restraining misaligning movement of said injector member relative to said casing.

5. The apparatus as claimed in claim 4 wherein said releasing means includes a movable arm and said cooperating means comprises a key channel provided on said injector member and said arm with said arm disposed to ride along said key channel as said injector member is moved between said retracted and said injected positions.

6. The apparatus as claimed in claim 5 wherein said releasing means includes another arm extending at a selected angle to said arm and said key channel including a stepped portion, said releasing means being pivotally mounted in said casing so that movement of said injector member between said positions will effect pivoting movement of said releasing means in response to movement of said arm past said stepped portion of said key channel.

7. The apparatus as claimed in claim 6 wherein spring means are provided to resiliently maintain said arm in contact with said key channel.

8. The apparatus as claimed in claim 7 wherein said another arm of said releasing means is movable into and out of said magazine means upon said pivoting of said releasing means, movement of said another arm into said magazine means being effective to prevent discharge of a said cleaning element therefrom with movement out of said magazine means being effective to permit discharge of at least one cleaning element from said magazine means.

9. The apparatus as claimed in claim 5 wherein spring means are provided to resiliently maintain said arm in contact with said key channel.

10. The apparatus as claimed in claim 3 wherein said cleaning element is substantially spherical in shape.

11. The apparatus as claimed in claim 3 wherein said casing has a selected length and said injector member has a length less than said selected length, said injector member having a cleaning element receiving opening formed on one side thereof, said magazine means having a delivery opening on said casing, with a portion of said receiving opening of said injector member being alignable with said delivery opening of said magazine means when said injector member is in said retracted position so that a cleaning element can be passed through said receiving opening to said injector member and then to said carrier portion.

12. The apparatus as claimed in claim 11 wherein, in use, said casing and injector member have longitudinal axes which are substantially vertically oriented so that passage of the cleaning element from said receiving opening to said carrier portion is substantially under the influence of gravity.

13. The apparatus as claimed in claim 12 wherein a bleed line is connected to the conduit and to said magazine means so that when said injector member is moved toward said injected position there will be fluid flow from said magazine means toward said opening in said casing.

14. The apparatus as claimed in claim 2 wherein said cleaning element is substantially spherical in shape.

15. The apparatus as claimed in claim 1 wherein said carrier portion includes seal means for substantially sealing off said casing from the fluid flowing in the conduit when said injector means is in said retracted position.

16. The apparatus as claimed in claim 1 wherein said cleaning element is substantially spherical in shape.

17. The apparatus as claimed in claim 1 wherein actuating means for actuating said injector means at a remote site are provided.

18. The apparatus as claimed in claim 17 wherein said actuating means includes means for sensing fluid pressure in the conduit.

19. The apparatus as claimed in claim 1 wherein said injector member includes a port adjacent said wall means, said port being spaced from said floor by said wall means

* * * * *